United States Patent
Seurynck

(10) Patent No.: US 11,082,494 B2
(45) Date of Patent: Aug. 3, 2021

(54) CROSS STORAGE PROTOCOL ACCESS RESPONSE FOR OBJECT DATA STORES

(71) Applicant: Western Digital Technologies, Inc., San Jose, CA (US)

(72) Inventor: Jense Seurynck, Merelbeke (BE)

(73) Assignee: Western Digital Technologies, Inc., San Jose, CA (US)

( * ) Notice: Subject to any disclaimer, the term of this patent is extended or adjusted under 35 U.S.C. 154(b) by 3 days.

(21) Appl. No.: 16/704,824

(22) Filed: Dec. 5, 2019

(65) Prior Publication Data

US 2021/0176315 A1 Jun. 10, 2021

(51) Int. Cl.
*G06F 15/16* (2006.01)
*H04L 29/08* (2006.01)
*G06F 9/54* (2006.01)
*H04L 29/06* (2006.01)

(52) U.S. Cl.
CPC .......... *H04L 67/1097* (2013.01); *G06F 9/542* (2013.01); *H04L 67/025* (2013.01); *H04L 67/32* (2013.01); *H04L 67/42* (2013.01)

(58) Field of Classification Search
CPC .................................................. H04L 67/1097
See application file for complete search history.

(56) References Cited

U.S. PATENT DOCUMENTS

| 2003/0065796 | A1 | 4/2003 | Borr |
| 2012/0078866 | A1 | 3/2012 | Oshri et al. |
| 2014/0089347 | A1* | 3/2014 | Thelen ................ G06F 16/183 707/783 |
| 2015/0067188 | A1 | 3/2015 | Chakhaiyar |
| 2016/0092126 | A1 | 3/2016 | Smith et al. |
| 2019/0370237 | A1* | 12/2019 | Cheru .................. G06F 16/289 |

OTHER PUBLICATIONS

International Search Report and Written Opinion of Application No. PCT/US2020/025301, dated Aug. 28, 2020 (10 pages).
Amazon User Guide, Creating an NFS File Share, Accessed Aug. 12, 2019, p. 1-3, https://docs.aws.amazon.com/storagegateway/latest/userguide/CreatingAnNFSFileShare.html.
Amazon Simple storage Service Developer Guide, Configuring Amazon S3 Event Notification, API Version Mar. 1, 2006, Accessed Aug. 12, 2019, p. 1-16, https://docs.aws.amazon.com/AmazonS3/latest/dev/NotificationHowTo.html.

* cited by examiner

*Primary Examiner* — Kevin T Bates
*Assistant Examiner* — Clarence D McCray
(74) *Attorney, Agent, or Firm* — Patent Law Works LLP

(57) ABSTRACT

Example distributed storage systems, cross-protocol engines, and methods support cross storage protocol access response for object data stores. Data storage operations targeting the same data object using distinct data storage protocols may be received and detected. A routine based on the data storage protocols being distinct from one another may be executed in response.

20 Claims, 11 Drawing Sheets

CROSS STORAGE PROTOCOL ACCESS RESPONSE FOR OBJECT DATA STORES

TECHNICAL FIELD

The present disclosure generally relates to data storage, and in a more particular example, to managing storage operations according to multiple storage protocols.

BACKGROUND

Often, distributed storage systems are used to store large amounts (e.g., terabytes, petabytes, exabytes, etc.) of data, such as objects or files in a distributed and fault tolerant manner with a predetermined level of redundancy.

Some existing object storage systems store data objects referenced by an object identifier versus file systems. This can generally allow object storage systems to surpass the maximum limits for storage capacity of file systems in a flexible way such that, for example, storage capacity can be added or removed as a function of the applications, systems, and/or enterprise needs, while reducing degradation in performance as the system grows. As a result, object storage systems are often selected for large-scale storage systems.

In some configurations, client systems supported by the distributed storage system may use different storage protocols for accessing data objects stored in the distributed storage system. For example, different client systems (and/or the client applications they support) may use a storage protocol compatible with Amazon Simple Storage Service (S3), Network File System (NFS), Server Message Block Protocol (SMB or Samba), Secure Shell File System (SSHFS), etc. In addition, different clients may run different versions of similar protocols, such as NFS version 3 versus NFS version 4. In some object storage systems, it may be desirable to support multiple data storage protocols for accessing the data objects stored in the object data store(s) of the object storage system.

An approach to having multiple storage protocols access an object storage system may be to provide a plurality of access nodes, where each access node is configured for a specific data storage protocol. Each access node may translate the client data requests received from their respective clients from the data storage protocol of the client systems into a data storage protocol for the object storage system behind the access node. The access nodes may provide other caching, load balancing, and similar storage functions that may operate outside the object storage system itself. However, such access nodes may represent a significant increase in cost and complexity of the distributed storage system and may not be appropriate for all situations.

In addition, each access node may serve its respective clients without monitoring or acknowledging when data objects are being accessed according to multiple storage protocols. In some instances, cross-protocol access may be an important event for management of the data object or distributed storage system more generally. For example, cross-protocol access may raise security or data integrity issues or provide a basis for additional processing by either the object storage system or a client system.

As large-scale storage systems scale and a greater variety of heterogeneous data storage protocols are used by clients, reliable and efficient implementations for managing cross-protocol access of data objects may be needed. A need exists for at least supporting an automated response to cross storage protocol access for object data stores that support multiple data storage protocols.

SUMMARY

Various aspects for data object storage, access, and management, particularly, the use of automated detection and response to cross storage protocol access of data objects are described.

One general aspect includes a computer-implemented method that includes: receiving a first data request for a first operation associated with a data object, where the first data request is formatted according to a first data storage protocol; receiving a second data request for a second operation associated with the data object, where the second data request is formatted according to a second data storage protocol; detecting that the second data storage protocol is distinct from the first data storage protocol; and executing a routine based on the second data storage protocol being distinct from the first data storage protocol.

Implementations may include one or more of the following features. The first data request may be received via a network from a first client and executing the routine based on the second data storage protocol being distinct from the first data storage protocol may include: generating a notification indicating the second operation and the second data storage protocol; and sending the notification to the first client. The computer-implemented method may include determining, at the first client, a process for processing a corresponding local instance of the data object based on the notification. The process may include deleting, responsive to receiving the notification, the corresponding local instance of the data object from a non-transitory data store associated with the first client. The first data request may be a write request to write the data object to a non-transitory data store and the second data request may be a read request to read the data object from the non-transitory data store. The computer-implemented method may include: determining the first operation associated with the first data request; and determining the second operation associated with the second data request, where detecting that the second data storage protocol is distinct from the first data storage protocol includes comparing a first protocol indicator associated with the first operation and a second protocol indicator associated with the second operation. The computer-implemented method may include: determining, based on a first protocol handler for the first data request, the first data storage protocol; and determining, based on a second protocol handler for the second data request, the second data storage protocol. The computer-implemented method may include: logging the first operation in a first operation entry in an operations log, where the first operation entry includes a first protocol indicator associated with the first operation and the data object; logging the second operation in a second operation entry in the operations log, where the second operation entry includes a second protocol indicator associated with the second operation and the data object; and querying the operations log for operation entries associated with the data object, where detecting that the second data storage protocol is distinct from the first data storage protocol includes retrieving the first protocol indicator from the first operation entry, retrieving the second protocol indicator from the second operation entry, and comparing the first protocol indicator to the second protocol indicator. Executing the routine based on the second data storage protocol being distinct from the first data storage protocol may include: generating, based on the first protocol indicator being different from the second protocol indicator, a cross-protocol access event; and initiating, responsive to the cross-protocol access event, a user notification process for a user of the data object. Executing the routine based on the second data storage protocol being distinct from the first data storage protocol may further include: adding the cross-protocol access event to an external notification event queue; processing the external notification event queue; and sending, responsive to initiating the user notification process, a notification message to a first client associated with the first data request.

Another general aspect includes a system that includes a client request handler and a cross-protocol engine. The client request handler is configured to: receive a first data request for a first operation associated with a data object, where the first data request is formatted according to a first data storage protocol; and receive a second data request for a second operation associated with the data object, where the second data request is formatted according to a second data storage protocol. The cross-protocol engine is configured to: detect that the second data storage protocol is distinct from the first data storage protocol, and execute a routine based on the second data storage protocol being distinct from the first data storage protocol.

Implementations may include one or more of the following features. The system may include: a network interface configured to receive the first data request via a network from a first client; and a notification engine configured to generate a notification indicating the second operation and second data storage protocol and send the notification to the first client. The system may further include the first client. The first client may include a non-transitory data store and be configured to: receive the notification; and determine, based on the notification, a process for processing a corresponding local instance of the data object stored in the non-transitory data store. The process may include deleting, responsive to receiving the notification, the corresponding local instance of the data object from a non-transitory data store associated with the first client. The system may further include a non-transitory data store. The first data request may be a write request to write the data object to the non-transitory data store and the second data request may be a read request to read the data object from the non-transitory data store. The cross-protocol engine may be further configured to: determine the first operation associated with the first data request; and determine the second operation associated with the second data request. Detecting that the second data storage protocol is distinct from the first data storage protocol may include comparing a first protocol indicator associated with the first operation and a second protocol indicator associated with the second operation. The system may further include: a first protocol handler configured to parse the first data request in accordance with the first data storage protocol; and a second protocol handler configured to parse the second data request in accordance with the second data storage protocol. Detecting that the second data storage protocol is distinct from the first data storage protocol may include: determining that the first data request was parsed by the first protocol handler; and determining that the second data request was parsed by the second protocol handler. The system may further include an operations log configured to: log the first operation in a first operation entry in an operations log, where the first operation entry includes a first protocol indicator associated with the first operation and the data object; and log the second operation in a second operation entry in the operations log, where the second operation entry includes a second protocol indicator associated with the second operation and the data object. The cross-protocol engine may be further configured to: query the operations log for operation entries associated with the data object; retrieve the first protocol indicator from the first operation entry; retrieve the second protocol indicator from the second operation entry; and compare the first protocol indicator to the second protocol indicator to detect that the second data storage protocol is distinct from the first data storage protocol. The cross-protocol engine may be further configured to: generate, based on the first protocol indicator being different from the second protocol indicator, a cross-protocol access event; and initiate, responsive to the cross-protocol access event, a user notification process for a user of the data object.

Another general aspect includes a system that includes: a non-transitory data store; means for receiving a first data request for a first operation associated with a data object to be written to the non-transitory data store, where the first data request is formatted according to a first data storage protocol; means for receiving a second data request for a second operation associated with the data object stored in the non-transitory data store, where the second data request is formatted according to a second data storage protocol; means for detecting that the second data storage protocol is distinct from the first data storage protocol; and means for executing a routine based on the second data storage protocol being distinct from the first data storage protocol.

The various embodiments advantageously apply the teachings of distributed storage networks and/or systems to improve the functionality of such computer systems. The various embodiments include operations to overcome or at least reduce the issues in the previous storage networks and/or systems discussed above and, accordingly, are more reliable and/or efficient than other computing networks. That is, the various embodiments disclosed herein include hardware and/or software with functionality to improve the operation of object data stores supporting cross-protocol access, such as by detecting cross-protocol access and executing routines in response to the cross-protocol access. Accordingly, the embodiments disclosed herein provide various improvements to storage networks and/or storage systems.

It should be understood that language used in the present disclosure has been principally selected for readability and instructional purposes, and not to limit the scope of the subject matter disclosed herein.

DETAILED DESCRIPTION

Figure 1:
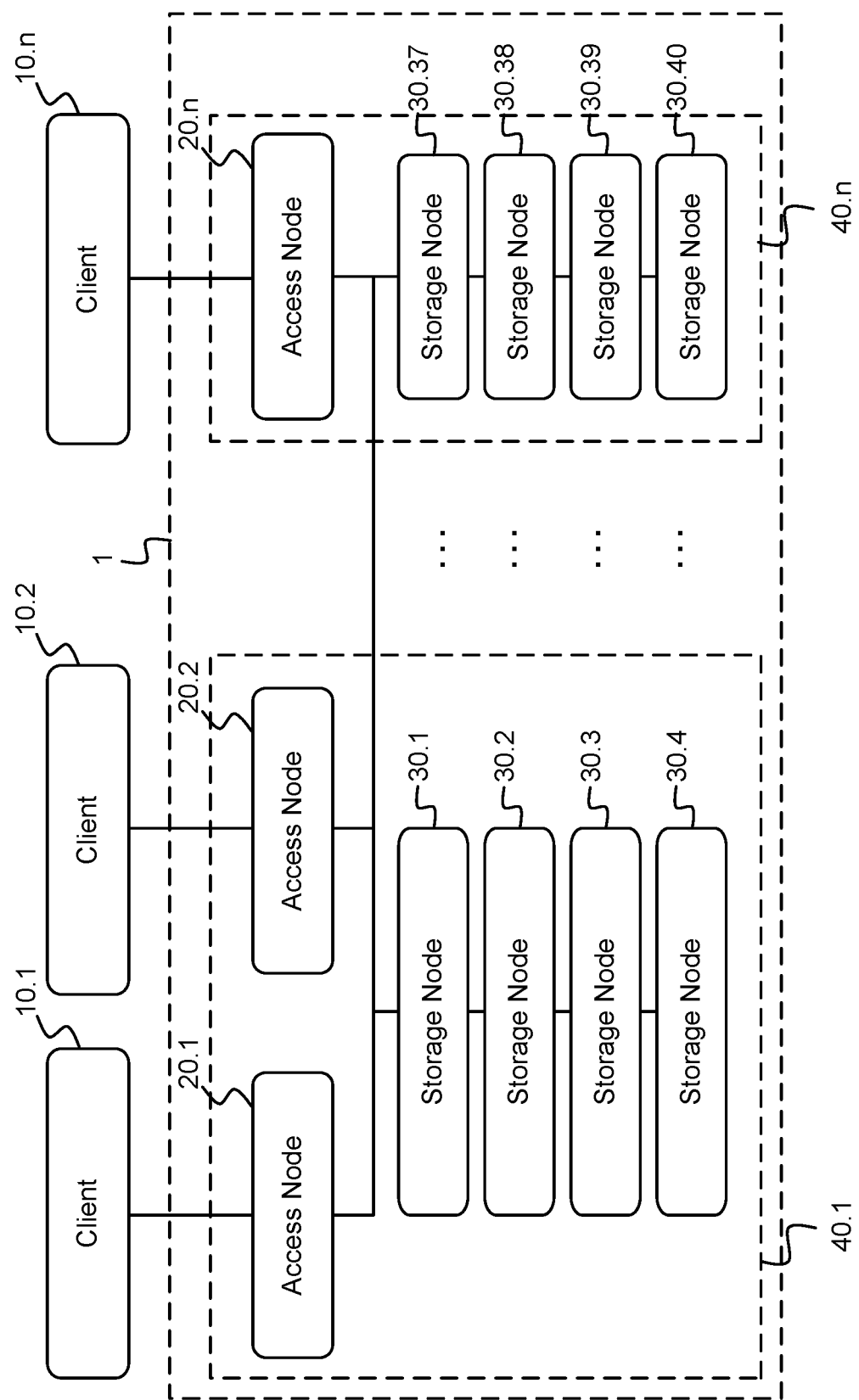
FIG. 1 schematically illustrates an example of a distributed storage system.

FIG. 1 shows an embodiment of an example distributed storage system 1. In some embodiments, the distributed storage system 1 may be implemented as a distributed object storage system which is coupled to one or more clients 10.1-10.n for accessing data objects through one or more access nodes 20.1-10.n. The connection between the distributed storage system 1 and clients 10 could, for example, be implemented as a suitable data communication network. Clients 10 may host or interface with one or more applications that use data stored in distributed storage system 1. Such an application could, for example, be a dedicated software application running on a client computing device, such as a personal computer, a laptop, a wireless telephone, a personal digital assistant or any other type of communication device that is able to interface directly with the distributed storage system 1. However, according to alternative embodiments, the applications could, for example, comprise a suitable file system which enables a general purpose software application to interface with the distributed storage system 1, an application programming interface (API) library for the distributed storage system 1, etc. In some embodiments, access nodes 20 may include a file interface system for receiving file data requests from clients 10 according to a file system protocol and access data in storage nodes 30.1-30.40 using a different storage protocol, such as an object storage protocol.

As further shown in FIG. 1, the distributed storage system 1 comprises a plurality of access nodes 20 and a plurality of storage nodes 30 which may be coupled in a suitable way for transferring data, for example by means of a conventional data communication network such as a local area network (LAN), a wide area network (WAN), a telephone network, such as the public switched telephone network (PSTN), an intranet, the internet, or any other suitable communication network or combination of communication networks. Access nodes 20, storage nodes 30 and the computing devices comprising clients 10 may connect to the data communication network by means of suitable wired, wireless, optical, etc. network connections or any suitable combination of such network connections. Although the embodiment of FIG. 1 shows only three access nodes 20 and forty storage nodes 30, according to alternative embodiments the distributed storage system 1 could comprise any other suitable number of storage nodes 30 and, for example, two, three or more access nodes 20 coupled to these storage nodes 30.

These access nodes 20 and storage nodes 30 may be built as general-purpose computers. Alternatively, they may be physically adapted for arrangement in large data centers, where they are arranged in modular racks 40.1-40.n comprising standard dimensions. Exemplary access nodes 20 and storage nodes 30 may be dimensioned to take up a single unit of such racks 40, which is generally referred to as 1 U. Such an exemplary storage node may use a low-power processor and may be equipped with ten or twelve high capacity serial advanced technology attachment (SATA) disk drives and is connectable to the network over redundant Ethernet network interfaces. An exemplary access node 20 may comprise high-performance servers and provide network access to clients 10 over multiple high bandwidth Ethernet network interfaces. Data can be transferred between clients 10 and such access nodes 20 by means of a variety of network protocols including hypertext transfer protocol (HTTP)/representational state transfer (REST) object interfaces, language-specific interfaces such as Microsoft .Net, Python or C, etc. Additionally, such access nodes may comprise additional high bandwidth Ethernet ports to interface with the storage nodes 30. In some embodiments, HTTP/REST protocols complying with the Amazon Simple Storage Service (S3) object storage service may enable data transfer through a REST application protocol interfaces (API). Such access nodes 20 may operate as a highly available cluster of controller nodes with one or more integrated and/or independent interface systems, and provide for example shared access to the storage nodes 30, metadata caching, protection of metadata, etc.

As shown in FIG. 1 several storage nodes 30 can be grouped together, for example because they are housed in a single rack 40. For example, storage nodes 30.1-30.4 and 30.37-30.40 each are respectively grouped into racks 40.1 and 40.n. Access nodes 20 may be located in the same or different racks as the storage nodes to which the access nodes connect. A rack may have multiple access nodes, for example rack 40.1, a single access node as rack 40.n, or no access nodes (not shown) and rely on an access node in another rack or storage nodes or clients with built-in access node and/or controller node capabilities. These racks are not required to be located at the same location, they are often geographically dispersed across different data centers, such as for example rack 40.1 can be located at a data center in Europe and 40.n at a data center in the USA.

Figure 2:
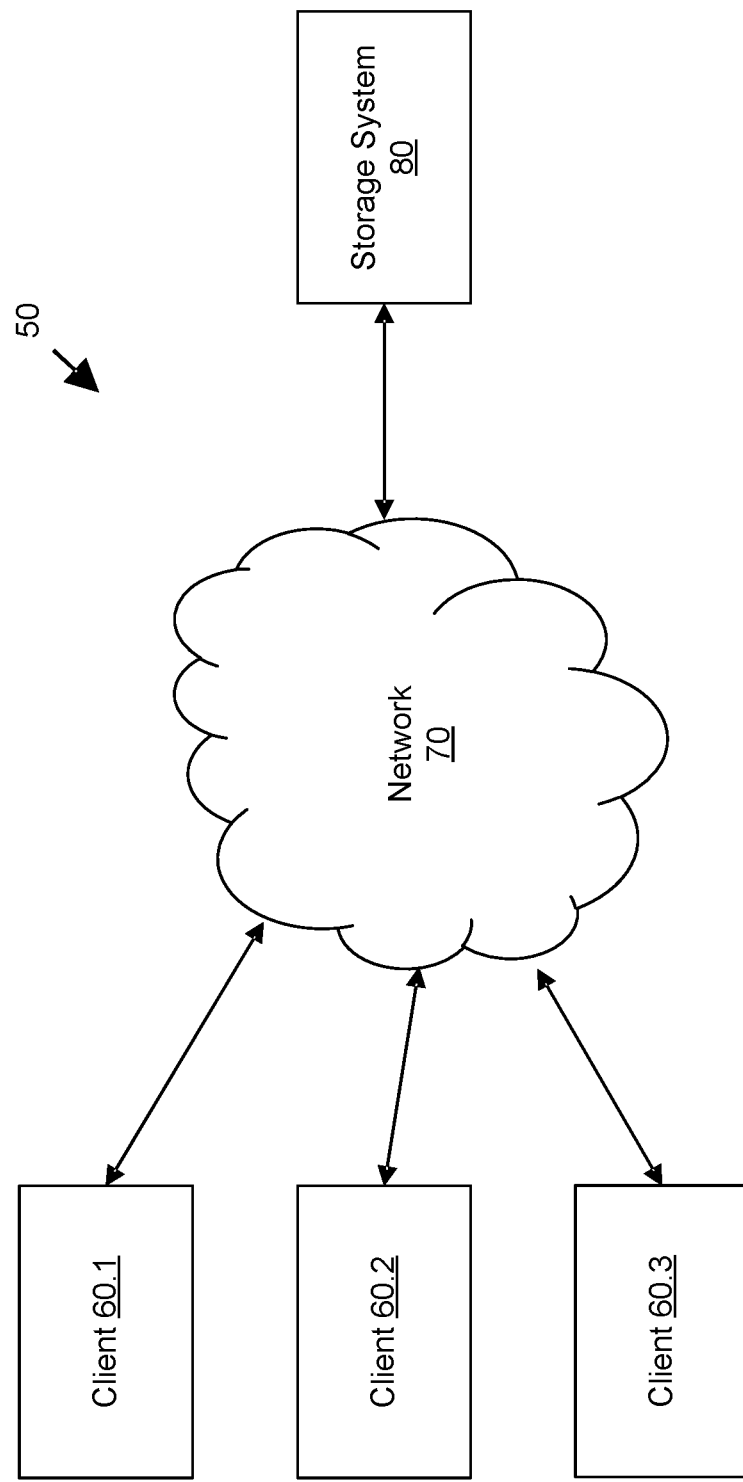
FIG. 2 schematically illustrates an example client architecture in which the distributed storage system of FIG. 1 may operate.

FIG. 2 is a block diagram of an example storage network 50 using a client architecture. In some embodiments, distributed storage system 1 may be embodied in such a storage network 50. As shown, storage network 50 can include multiple client devices 60 capable of being coupled to and in communication with a storage network 50 via a wired and/or wireless network 70 (e.g., public and/or private computer networks in any number and/or configuration (e.g., the Internet, an intranet, a cloud network, etc.)), among other examples that may include one client device 60.1 or two or more client devices 60 (e.g., is not limited to three client devices 60.1-60.3).

A client device 60 can be any computing hardware and/or software (e.g., a thick client, a thin client, or hybrid thereof) capable of accessing storage system 80 utilizing network 70. Each client device 60, as part of its respective operation, relies on sending input/output (I/O) requests to storage system 80 to write data, read data, and/or modify data. Specifically, each client device 60 can transmit I/O requests to read, write, store, communicate, propagate, and/or transport instructions, data, computer programs, software, code, routines, etc., to storage system 80. Client device(s) 60 and storage system 80 may comprise at least a portion of a client-server model. In general, storage system 80 can be accessed by client device(s) 60 and/or communication with storage system 80 can be initiated by client device(s) 60 through a network socket (not shown) utilizing one or more inter-process networking techniques. In some embodiments, client devices 60 may access one or more applications to use or manage a distributed storage system, such as distributed storage system 1 in FIG. 1.

Figure 3:
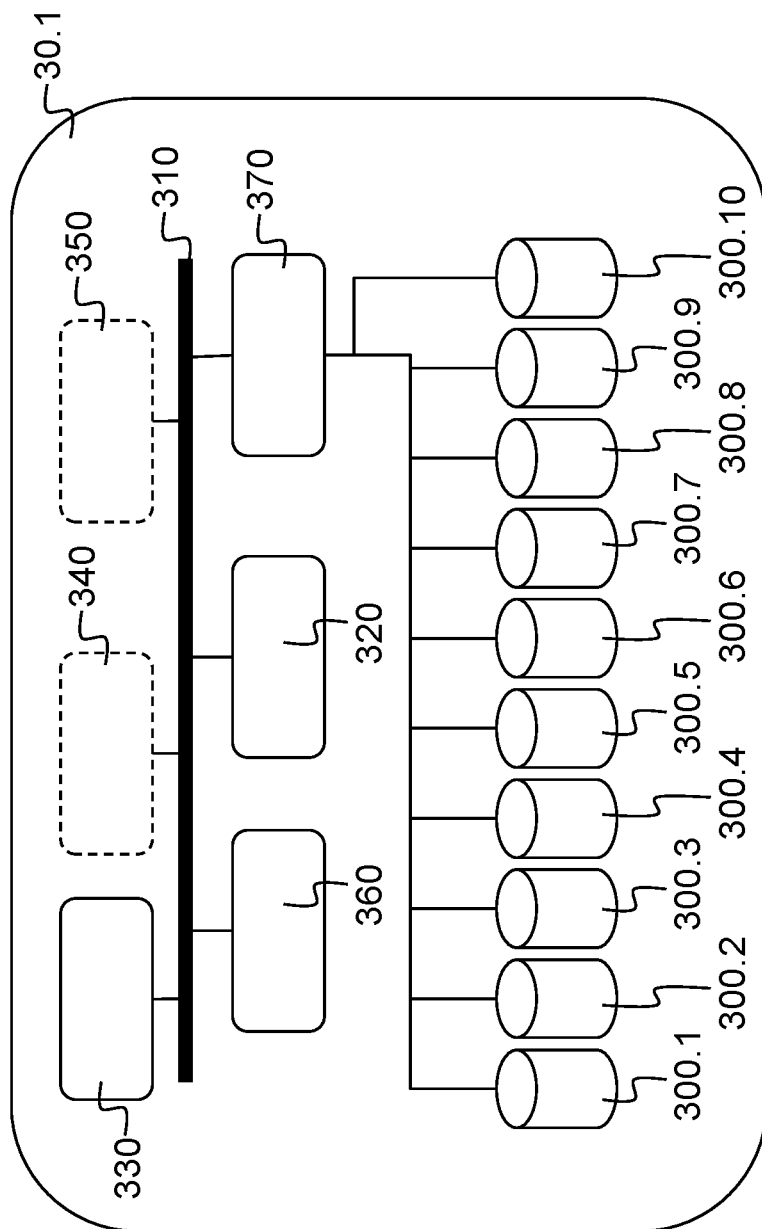
FIG. 3 schematically illustrates an example of a storage node of the distributed storage system of FIG. 1.

FIG. 3 shows a schematic representation of an embodiment of one of the storage nodes 30. Storage node 30.1 may comprise a bus 310, a processor 320, a local memory 330, one or more optional input units 340, one or more optional output units 350, a communication interface 360, a storage element interface 370, and two or more storage elements 300.1-300.10. Bus 310 may include one or more conductors that permit communication among the components of storage node 30.1. Processor 320 may include any type of conventional processor or microprocessor that interprets and executes instructions. Local memory 330 may include a random access memory (RAM) or another type of dynamic storage device that stores information and instructions for execution by processor 320 and/or a read only memory (ROM) or another type of static storage device that stores static information and instructions for use by processor 320. Input unit 340 may include one or more conventional mechanisms that permit an operator to input information to the storage node 30.1, such as a keyboard, a mouse, a pen, voice recognition and/or biometric mechanisms, etc. Output unit 350 may include one or more conventional mechanisms that output information to the operator, such as a display, a printer, a speaker, etc. Communication interface 360 may include any transceiver-like mechanism that enables storage node 30.1 to communicate with other devices and/or systems, for example mechanisms for communicating with other storage nodes 30 or access nodes 20 such as for example two 1 gigabit (Gb) Ethernet interfaces.

Storage element interface 370 may comprise a storage interface such as for example a SATA interface or a small computer system interface (SCSI) for connecting bus 310 to one or more storage elements 300, such as one or more local disks, for example 3 terabyte (TB) SATA disk drives, and control the reading and writing of data to/from these storage elements 300. In one exemplary embodiment as shown in FIG. 2, such a storage node 30.1 could comprise ten or twelve 3 TB SATA disk drives as storage elements 300.1-300.10 and in this way storage node 30.1 would provide a storage capacity of 30 TB or 36 TB to the distributed storage system 1. According to the exemplary embodiment of FIG. 1 and in the event that storage nodes 30.2-30.40 are identical to storage node 30.1 and each comprise a storage capacity of 36 TB, the distributed storage system 1 would then have a total storage capacity of 1440 TB.

As is clear from FIGS. 1 and 3 the distributed storage system 1 comprises a plurality of storage elements 300. As will be described in further detail below, the storage elements 300, could also be referred to as redundant storage elements 300 as the data is stored on these storage elements 300 such that none or a specific portion of the individual storage elements 300 on its own is critical for the functioning of the distributed storage system. Each of the storage nodes 30 may comprise a share of these storage elements 300.

As shown in FIG. 3 storage node 30.1 comprises ten storage elements 300.1-300.10. Other storage nodes 30 in FIG. 1 could comprise a similar amount of storage elements 300, but this is, however, not essential. Storage node 30.2 could, for example, comprise six storage elements 300.11-300.16, and storage node 30.3 could, for example, comprise four storage elements 300.17-300.20. As will be explained in further detail below, the distributed storage system 1 may be operable as a distributed object storage system to store and retrieve a data object comprising data (e.g., 64 megabytes (MB) of binary data) and a data object identifier for addressing this data object, for example, a universally unique identifier such as a globally unique identifier (GUID). Embodiments of the distributed storage system 1 may operate as a distributed object storage system. Storing the data offered for storage by the application in the form of a data object, also referred to as object storage, may have specific advantages over other storage schemes such as block-based storage or file-based storage.

The storage elements 300 or a portion thereof may be redundant and operate independently of one another. This means that if one particular storage element 300 fails its function it can easily be taken on by another storage element 300 in the distributed storage system 1. However, as will be explained in more detail further below, the storage elements 300 are capable of providing redundancy without having to work in synchronism, as is for example the case in many well-known redundant array of independent disks (RAID) configurations, which sometimes even require disk spindle rotation to be synchronized. Furthermore, the independent and redundant operation of the storage elements 300 may allow a suitable mix of types of storage elements 300 to be used in a particular distributed storage system 1. It is possible to use for example storage elements 300 with differing storage capacity, storage elements 300 of differing manufacturers, using different hardware technology such as for example conventional hard disks and solid state storage elements, using different storage interfaces such as for example different revisions of SATA, parallel advanced technology attachment (PATA), and so on. This may result in advantages relating to scalability and flexibility of the distributed storage system 1 as it allows for adding or removing storage elements 300 without imposing specific requirements to their design in correlation to other storage elements 300 already in use in the distributed object storage system.

Figure 4:
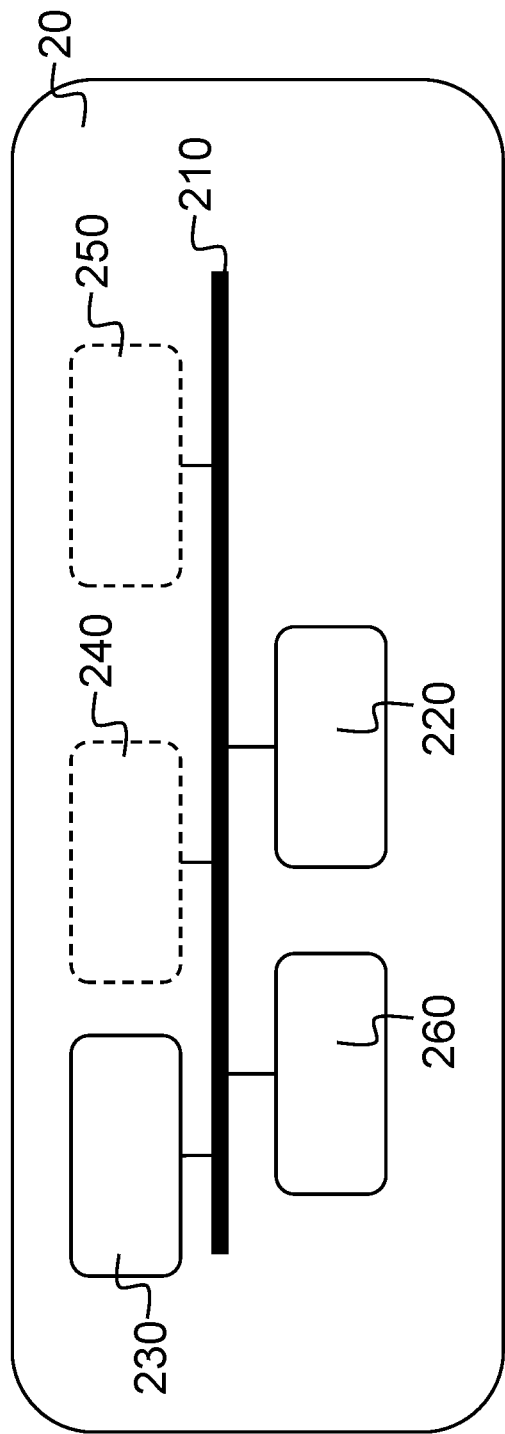
FIG. 4 schematically illustrates an example of a controller node or access node of the distributed storage system of FIG. 1.

FIG. 4 shows a schematic representation of an embodiment of the access node 20. Access node 20 may include controller node functions and/or file system interface functions for client systems using file system protocols to access data stored in data objects in storage nodes 30. Access node 20 may comprise a bus 210, a processor 220, a local memory 230, one or more optional input units 240, one or more optional output units 250. In some embodiments, access node 20 may include object storage management functions, including object storage interface functions, version control management, and/or replication engines.

Bus 210 may include one or more conductors that permit communication among the components of access node 20. Processor 220 may include any type of conventional processor or microprocessor that interprets and executes instructions. Local memory 230 may include a random access memory (RAM) or another type of dynamic storage device that stores information and instructions for execution by processor 220 and/or a read only memory (ROM) or another type of static storage device that stores static information and instructions for use by processor 320 and/or any suitable storage element such as a hard disc or a solid state storage element. An optional input unit 240 may include one or more conventional mechanisms that permit an operator to input information to the access node 20 such as a keyboard, a mouse, a pen, voice recognition and/or biometric mechanisms, etc. Optional output unit 250 may include one or more conventional mechanisms that output information to the operator, such as a display, a printer, a speaker, etc. Communication interface 260 may include any transceiver-like mechanism that enables access node 20 to communicate with other devices and/or systems, for example mechanisms for communicating with other storage nodes 30 or access nodes 20 such as for example two 10 Gb Ethernet interfaces.

According to an alternative embodiment, the access node 20 could have an identical design as a storage node 30, or according to still a further alternative embodiment one of the storage nodes 30 of the distributed object storage system could perform both the function of an access node 20 and a storage node 30. According to still further embodiments, the components of the access node 20 as described in more detail below could be distributed amongst a plurality of access nodes 20 and/or storage nodes 30 in any suitable way. According to still a further embodiment, the clients 10 may run an access node 20. According to still further embodiments, access node 20 may be embodied in separate controller nodes and interface nodes with or without redundancy among the controller nodes and/or interface nodes.

Figure 5:
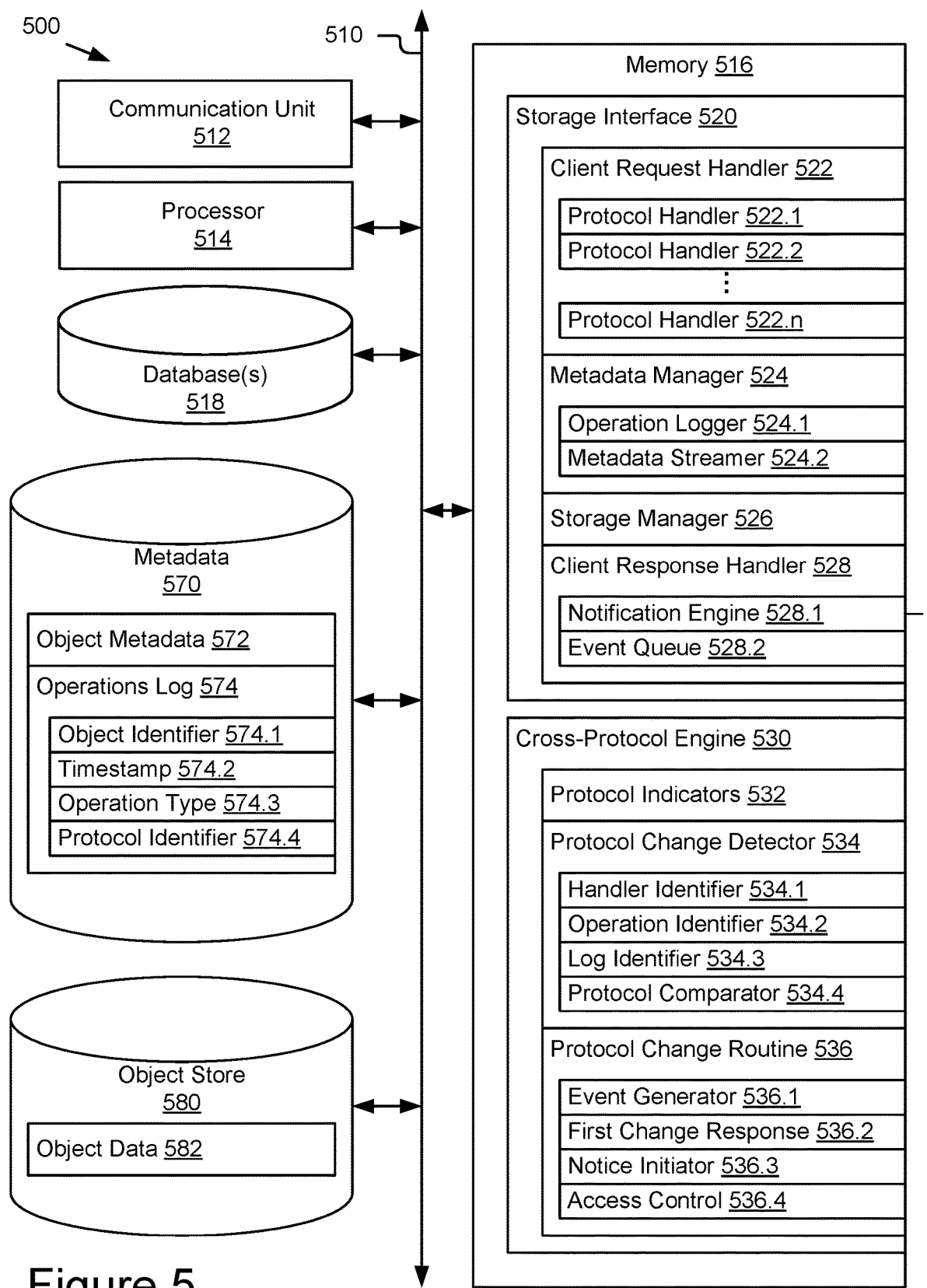
FIG. 5 schematically illustrates some example elements of an object storage system for the distributed storage system of FIG. 1.

FIG. 5 schematically shows selected modules of an access node or controller node with a storage interface that supports multiple protocols, cross-protocol handler, and supporting functions. Object storage system 500 may be configured as a node with an architecture and/or hardware similar to controller nodes and/or storage nodes. Object storage system 500 may incorporate elements and configurations similar to those shown in FIGS. 1-4. For example, object storage system 500 may be configured in an access node 20 with object storage management functions. In some embodiments, object storage system 500 may be configured in a single access or controller node that supports multiple data storage protocols without relying on separate access nodes for each protocol.

Object storage system 500 may include a bus 510 interconnecting at least one communication unit 512, at least one processor 514, and at least one memory 516. Bus 510 may include one or more conductors that permit communication among the components of access system 500. Communication unit 512 may include any transceiver-like mechanism that enables access system 500 to communicate with other devices and/or systems. For example, communication unit 512 may include wired or wireless mechanisms for communicating with file system clients, other access systems, and/or one or more object storage systems or components, such as storage nodes or controller nodes. In some embodiments, communication unit 512 may include a network interface, such as a network interface card (NIC) or similar device. Processor 514 may include any type of processor or microprocessor that interprets and executes instructions. Memory 516 may include a random access memory (RAM) or another type of dynamic storage device that stores information and instructions for execution by processor 514 and/or a read only memory (ROM) or another type of static storage device that stores static information and instructions for use by processor 514 and/or any suitable storage element such as a hard disk or a solid state storage element.

Object storage system 500 may include or have access to one or more databases and/or specialized data stores, such metadata store 570 and object store 580. Databases may include one or more data structures for storing, retrieving, indexing, searching, filtering, etc. of structured and/or unstructured data elements. In some embodiments, metadata store 570 may be structured as reference data entries and/or data fields indexed by metadata key value entries related to data objects stores in object store 580. Object store 580 may include data objects comprised of object data (such as host data), some amount of metadata (stored as metadata tags), and a GUID. Metadata store 570, object store 580, and/or other databases or data structures may be maintained and managed in separate computing systems, such as storage nodes, with separate communication, processor, memory, and other computing resources and accessed by access system 500 through data access protocols. Metadata store 550 and object store 560 may be shared across multiple object storage systems 500.

In some embodiments, metadata store 570 and/or object store 580 may be sharded across multiple storage nodes. For example, object store 580 may include data objects and/or buckets of data objects that are managed across multiple storage nodes in redundant shards using replication functions to maintain substantial synchronization of available data objects. Object metadata and operations logs in metadata store 570 may be used to manage the redundant data shards and may themselves be sharded across multiple storage nodes.

Object storage system 500 may include a plurality of modules or subsystems that are stored and/or instantiated in memory 516 for execution by processor 514. For example, memory 516 may include a storage interface 520 configured to receive, process, and respond to object data requests from client systems or other nodes in distributed storage system 1. Memory 516 may include a cross-protocol engine 530 configured to monitor for storage operations that access a data object using different data storage protocols and initiate one or more routines in response. In some embodiments, cross-protocol engine 530 may be integrated into storage interface 520 and/or managed as separate libraries or background processes (e.g., daemon) through an API or other interface.

Storage interface 520 may include an interface protocol or set of functions and parameters for storing, reading, and otherwise managing data requests to an associated distributed storage system and the corresponding metadata data source for mapping file data to persistent storage data elements. For example, storage interface 520 may include functions for reading, writing, modifying, or otherwise manipulating data objects and their respective client or host data and metadata in accordance with the protocols of an object storage system. In some embodiments, storage interface 520 may support multiple data storage protocols for storage requests from client systems. For example, storage requests may be received with addressing, formatting, and parameters compatible with two or more data storage protocols, such as Amazon Simple Storage Service (S3), Network File System (NFS), Server Message Block Protocol (SMB or Samba), Secure Shell File System (SSHFS), etc. and various versions thereof.

In some embodiments, storage interface 520 may include a plurality of hardware and/or software modules configured to use processor 514 and memory 516 to handle or manage defined operations of storage interface 520. For example, storage interface 520 may include a client request handler 522, a metadata manager 524, a storage manager 526, and a client response handler 528. For any given client request, storage interface 520 may receive a client request through client request handler 522 and determine one or more operations based on the content of the request. These operations may include metadata operations handled by metadata manager 524 and/or object data operations handled by storage manager 526. The results of these operations may be processed, formatted, and returned by client response handler 528.

Client request handler 522 may include an interface and/or communication event-based condition for receiving object data requests from one or more clients. For example, client systems may send an object data request over a network connection and addressed to object storage system 500 or a port or component thereof. Client request handler 522 may receive these requests and parse them according to the appropriate communication and data storage protocols. For example, client request handler 522 may identify a transaction identifier, a client identifier, an object identifier (object name or GUID), a data operation, and additional parameters for the data operation, if any, from the received message or messages that make up the object data request.

In some embodiments, client request handler 522 may receive requests from one or more client applications. For example, the client applications may be hosted on other systems (e.g., host application servers) and may write, read, delete, and otherwise manipulate data objects stored in object store 580. Client request handler 522 may receive delete requests that determine that an indicated data object should be rendered inaccessible to client applications and removed from object store 580. In some embodiments, different client systems and/or client applications may be configured to access data objects or other storage features of object storage system 500 in accordance with different data storage protocols.

Client request handler 522 may be configured to identify the data storage protocol being used for the client data request and include different protocol handlers 522.1-522.$n$ for parsing requests in each supported data storage protocol. For example, protocol handler 522.1 may support S3 data requests, protocol handler 522.2 may support NFS 3 data requests, and protocol handler 522.$n$ may support NFS 4 data requests. In some embodiments, each protocol handler 522.1-$n$ may include or access a mask or mapping algorithm for identifying the parameters contained in the request and/or logical rules for translating features and parameter values from the data storage protocol received into an internal parameters and functions for processing the data requests. Client request handler 522 may use protocol handlers 522.1-$n$ to parse the data request parameters like transaction identifier, client identifier, object identifier (object name or GUID), data operation, and additional parameters for the data operation and forward them to metadata manager 524 and/or storage manager 526 for further processing. In some embodiments, protocol handlers 522.1-$n$ may each be allocated to a specific port of communication unit 512. For example, object storage system 500 may include a network interface card with two ports and the first port may be allocated to S3 data requests and the second port may be allocated to NFS data requests. Protocol handler 522.1 may monitor communications received on the first port and protocol handler 522.2 may monitor communications received on the second port.

Metadata manager 524 may include interfaces, functions, and/or parameters for creating, modifying, deleting, accessing, and/or otherwise managing object metadata, such as object metadata 572 stored in metadata store 570. For example, when a new object is written to object store 580, at least one new metadata entry may be created in metadata store 570 to represent parameters describing or related to the newly created object. Metadata manager 524 may generate and maintain an object data index for managing object metadata 572 and enabling metadata manager 524 to locate object metadata within metadata store 570. For example, metadata store 570 may be organized as a key-value store and the object data index may include key values for data objects.

In some embodiments, metadata store 570 may include one or more operation logs 574 for storing log operation entries for operations, such as write, read, delete, etc., targeting the data objects in object store 580. Metadata manager 524 may include an operation logger 524.1 for generating and storing operation entries in operations entries in operations log 574. For example, operations entries related to data objects may be indexed with a key value that includes the object identifier 574.1 or GUID for each object, an operation time value 574.2 (such as a timestamp or inverse timestamp) for when the operation occurred, and an operation type 574.3. A write operation may include a write or object creation type that indicates a new object was created with the specified object identifier at the operation timestamp. A read operation may include a read or data access type that indicates an existing object or object version was read with the specified object identifier at the operation timestamp. A delete operation may include a delete or kill type that indicates the specified data object is logically deleted at the operation timestamp and marked for garbage collection (generally at a later time). In some embodiments, operation entries may further include protocol identifier 574.4 that indicates what data storage protocol initiated the data operation. For example, when a protocol handler 522.1-$n$ forwards the parameters for the data operation, the protocol handler may include a protocol identifier 574.4 and/or operation logger 524.1 may be configured to assign protocol identifier 574.4 based on which protocol handler forwarded the operation and/or other parameters of the operation.

In some embodiments, metadata manager 524 may include a metadata streamer 524.2 configured to traverse operations log 574 and identify or determine operation entries of interest for use in other functions. For example, metadata streamer 524.2 may be used to locate operation entries for replication, garbage collection, aggregation of storage parameters, and other background operations. In some embodiments, metadata streamer 524.2 may be used to scan or query operations log 574 for operation entries with the same object identifier 574.1. The operation entries for the same object may then be provided for use by other functions, such as cross-protocol engine 530.

In some embodiments, metadata manager 524 may also manage object metadata stored in object store 580 with object data 582. Metadata manager 524 may work in conjunction with storage manager 526 to create, modify, delete, access or otherwise manage object metadata stored as object tags within object store 580.

Storage manager 526 may include interfaces, functions, and/or parameters for reading, writing, and deleting object data elements in object store 580. For example, object PUT commands may be configured to write an object identifier, object data 582, and/or object tags to object store 580. Object GET commands may be configured to read data from object store 580. Object DELETE commands may be configured to delete data from object store 580, or at least mark a data object for logical deletion until a future garbage collection or similar operation physically deletes the data or reallocates the physical storage location to another purpose. Other object storage commands may be handled by storage manager 526. Object storage commands processed by storage manager 526 may include parameters for accessing special functions and/or metadata resources stored with host or client data in the data objects.

Client response handler 528 may include an interface and/or communication logic for sending response messages, such as result, status, or error messages, to one or more clients related to object data requests received. For example, client response handler 528 may wait for processing by metadata manager 524 and/or storage manager 526 to complete or generate an error, and then provide an appropriate result or error message to the client system(s) for each object data request received.

In some embodiments, client response handler 528 may include a notification engine 528.1 configured to generate notification messages and send them to the appropriate client system or system utility. For example, as data objects are stored or deleted in response to client data requests, notification engine 528.1 may generate a confirmation message responsive to the original request and including an operation identifier and status identifier used by the client system to confirm execution of the request. As another example, notification engine 528.1 may generate an error message when a request fails, times out, or does not meet one or more conditions for execution, such as object ownership/use privileges, security validation, usage caps, valid targets and parameters for the operation, etc. In some embodiments, notification engine 528.1 may include logic for processing various events and related parameters to generate the corresponding notification messages. While some systems may respond to events as they occur, others may rely on an event queue 528.2 to manage the events generated by parallel foreground and background operations in object storage system 500. For example, event queue 528.2 may include one or more lists, tables, or other data structures with entries related to events that may generate an external notification. Notification engine 528.1 may process the external event queue and include logic for prioritizing and selecting events from event queue 528.2 for notification.

In some embodiments, metadata store 570 may be distributed across multiple systems, such as a plurality of access systems. Metadata store 570 and/or portions thereof may be sharded data stores, wherein the data stores are partitioned into segments stored in different computing systems. Storage interface 520 may include the functions for locating and accessing relevant portions of the sharded database.

Cross-protocol engine 530 may be invoked by storage interface 520 to determine or identify cross-protocol access events for data objects in object store 560 and make that information available to other functions and clients. For example, cross-protocol engine 530 may monitor one or more components in storage interface 520 and/or metadata store 570 to identify data objects accessed using more than one protocol and generate a response to the data operations that accessed the data object. Cross-protocol engine 530 may provide interfaces, functions, and parameters for generating cross-protocol access events that may be processed through other components, such as client response handler 528 to provide notification and/or initiate responsive routines on other systems, such as clients or system utilities. Other functions, processes, or components may use the cross-protocol access events and related parameters for their own processes and decision-making logic without having to separately monitor for cross-protocol access.

In some embodiments, cross-protocol engine 530 may be included within storage interface 520, such as within library functions used by client request handler 522, metadata manager 524, storage manager 526, and/or client response handler 528 for managing cross-protocol access. In some embodiments, cross-protocol engine 530 may be configured as a separate service or background operation (e.g., daemon) for managing cross-protocol access events and/or related state information for one or more data objects. In some embodiments, cross-protocol engine 530 may include one or more hardware and/or software modules or data structures for executing specific operations. For example, cross-protocol engine 530 may include protocol indicators 532, a protocol change detector 534, and a protocol change routine 536.

Protocol indicators 532 may include one or more parameters, data structures, and/or related methods for manipulating those parameters or data structures. Protocol indicators 532 may be configured to identify the different data storage protocols supported by object storage system 500 for access to object store 580. For example, protocol indicators 532 may include logic and a table data structure for identifying the different data storage protocols handled by protocol handlers 522.1-n. In some embodiments, protocol indicators 532 may be organized in a configuration file or portion thereof related to object storage system 500 and may include one or more unique protocol identifier values used by cross-protocol engine 530 and other components to identify data requests and operations associated with a particular protocol. The protocol identifier values may include any variable type as appropriate to storing and communicating the data storage protocol as a parameter. For example, strings, flags, or numeric codes may be used to represent the plurality of data storage protocol identifier values.

Protocol change detector 534 may include functions, methods, or operations for detecting changes in the data storage protocols used to create, access, or otherwise operate on a data object in object store 580. For example, if one data storage protocol is used to create a data object and a distinct or different data storage protocol is later used to read or delete that data object, protocol change detector 534 may be configured to determine or identify that the second protocol is distinct from the first and initiate protocol change routine 536. In some embodiments, each time a new client data request or data operation targeting a data object is processed, protocol change detector 534 may be initiated to determine whether a change in protocol has occurred between the most recent client data request and one or more prior data requests. For example, protocol change detector 534 may operate in response to each data request after a data object is created and compare the protocol indicator value of the new request to the protocol indicator value of the request that created the data object.

In some embodiments, protocol change detector 534 may be configured with one or more identifier modules for detecting protocol changes based on different sources of protocol indicators. For example, protocol change detector 534 may include a handler identifier 534.1, an operation identifier 534.2, and/or a log identifier 534.3. Each identifier may include separate logic and target a different component in storage interface 520 and/or metadata store 570 to determine the protocols associated with an operation. Handler identifier 534.1 may receive a protocol indicator value from the protocol handler that parses the incoming client data request. For example, each protocol handler 522.1-n may assign a protocol identifier and pass it with the parameters of the subsequent data operation and/or the identity of the protocol handler itself may function as a unique protocol indicator and be associated with the resulting data operation. Operation identifier 534.2 may parse the parameters in an operation being passed from client request handler 522 to metadata manager 524 and/or storage manager 526 to determine a protocol indicator. For example, operation parameters may include a protocol identifier value among the fields or values describing the operation. Log identifier 534.3 may process operations log 574 and/or a subset of operations log 574 identified through metadata streamer 524.2 for a data object, where the operations entries include protocol identifier 574.4.

Protocol change detector 534 may include a protocol comparator 534.4 for comparing the set of protocol indicators for two or more client data requests to determine whether they are distinct or different. For example, protocol comparator 534.4 may include logical rules for evaluating the protocol identifier value for one operations log entry against the protocol identifier value for a new operations log entry. In some embodiments, protocol comparator 534.4 may use the protocol identifier value of the write request that created the data object as an original data storage protocol for the data object and compare each subsequent protocol identifier value for each later client request to detect a protocol change. Protocol change detector 534 may return a "no change" value when the protocol identifier values match one another or correspond to the same data storage protocol and may return a "change detected" value when the protocol identifier values do not match or otherwise correspond to distinct data storage protocols.

Protocol change routine 536 may include functions, methods, or operations for initiating a cross-protocol access response routine. For example, in response to a change detected by protocol change detector 534, protocol change routine 538 may generate a cross-protocol access event and initiate a client notification process. In some embodiments, protocol change routine 536 may include an event generator 536.1 configured to generate a cross-protocol access event that may trigger any number of additional system responses. For example, event generator 536.1 may generate an event instance with parameters describing the cross-protocol access event and add the event instance to one or more event queues for further processing, such as event queue 528.2. Other components may maintain event queues for initiating additional processing and/or respond to events as a trigger condition for additional processing.

In some embodiments, protocol change routine 536 may include one or more sets of logical rules for determining the response to certain types of cross-protocol access events. For example, protocol change routine 536 may be configured to only generate a first change response 536.2 for the first change in protocol after the data object is created. This may allow specific instances or conditions of a protocol change to determine whether and what the response should be.

In some embodiments, protocol change routine 536 may include integrated logic for completing more of the routine initiated by the cross-protocol access event. For example, protocol change routine 536 may include an integrated notice initiator 536.3 that generates and sends one or more notifications to clients or other system utilities without relying on client response handler 528. In some embodiments, notice initiator 536.3 may pass notification parameters for the change in protocol access to notification engine 528.1 without using a separate event instance or event queue 528.2. In some embodiments, protocol change routine 536 may initiate other processes within object storage system 500, such as triggering access controls 536.4 to determine whether the change in access protocol meets the access controls for the object, user, etc. For example, access control 536.4 may initiate a security procedure in storage interface 520 to deny or delay completion of the data storage or access operation with a different data storage protocol until notice initiator 536.3 and notification engine 528.1 have notified the client system that originated the data object. In some embodiments, access control 536.4 may await a confirmation message from the notified client system that authorizes completion of the data access operation or, absent such a confirmation, denies the data storage request through client response handler 528 (e.g., returns a "403 Forbidden" message for an S3 protocol or a "permission denied" message for an NFS protocol.

Memory 516 may include additional logic and other resources (not shown) for processing object data requests, such as modules for generating, queueing, and otherwise managing object data requests. Processing of an object data request by storage interface 520 may include any number of intermediate steps that yield at least one data request to the distributed storage system.

Figure 6:
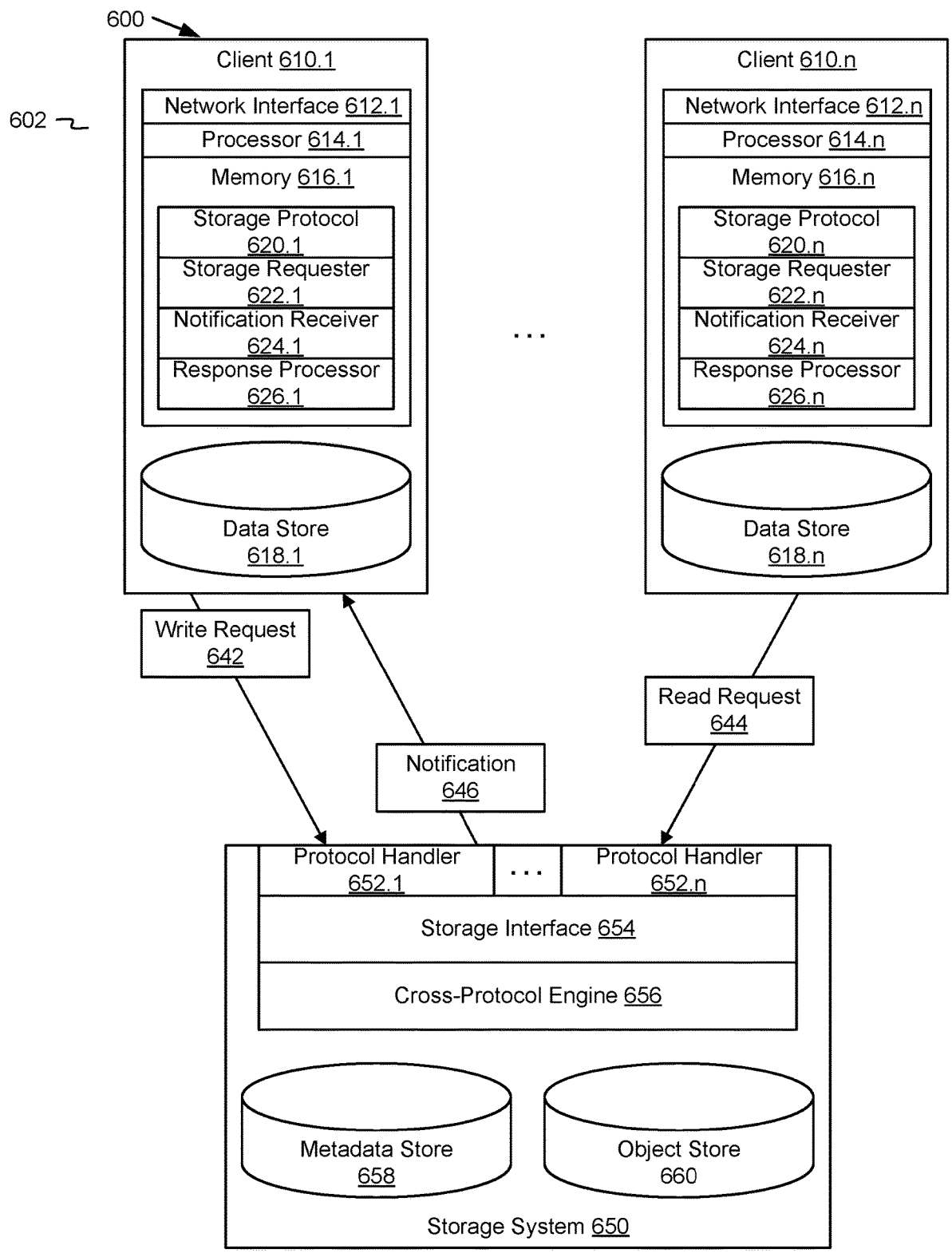
FIG. 6 schematically illustrates some example components supporting cross-protocol access and client notification for the distributed storage system of FIG. 1.

FIG. 6 shows exchanges among client systems 610.1-$n$ and object storage system 650 in a distributed storage system 600 configured for multiple data storage protocols. In some embodiments, object storage systems 650 may be configured according to the systems and elements described with regard to FIGS. 1-5. In the example shown, client system 610.1 sends write request 642 to object storage system 650 using storage protocol 620.1, client system 610.2 subsequently sends read request 644 to object storage system 650 using storage protocol 620.$n$, where storage protocol 620.1 is different from storage protocol 620.$n$. Storage system 650 may identify that a cross-protocol access event has occurred and send notification 646 to client 610.1 to initiate further processing by client system 610.1. While only two client systems 610 are shown, any number of client systems may be configured for communication with and object storage in object storage system 650. Similarly, while only a single object storage system 650 is shown, any number of object storage systems may support client systems 610 in a many-to-many configuration utilizing multiple data storage protocols for communications among the various client systems and object storage systems.

In some embodiments, client systems 610 may be configured as remote client systems supporting one or more client applications that use data objects stored in object storage system 650. Client systems 610 may be similar to the clients described with regard to FIGS. 1 and 2. In the example shown, client systems 610 may each include a network interface 612 (or other communication unit), processor 614, memory 616, and non-transitory data store 618. For example, client systems 610 may use network interface 612, processor 614, and memory 616 to receive, process, and transmit client application data among applications users and object storage system 650. In some embodiments, client application data may be stored as local versions in non-transitory data store 618 before, during, and/or after that client application data is stored to object storage system 650.

Client systems 610 may include storage protocol 620 stored in memory 616 and executable by processor 614 to configure storage requester 622 and notification receiver 624 to communicate with object storage system 650 using channels, formats, and parameters compatible with their respective data storage protocols. For example, storage protocol 620.1 may be an S3 storage protocol configuration and storage protocol 620.$n$ may be an NFS storage protocol configuration. Storage requester 622 may be configured to generate and send data storage requests, such as data object write, read, delete, and similar data storage commands, to object storage system 650. Notification receiver 624 may be configured to receive notifications and other response messages from object storage system 650.

In some embodiments, client systems 610 may each include a response processor 626 configured to execute a local process on the client system in response to notification 646 from object storage system 650. For example, response processor 626.1 may be initiated by a cross-protocol access notification telling client system 610.1 that client system 610.$n$ has accessed a data object initially written in response to write request 642. In some embodiments, response processor 626 may support one or more response sequences or actions triggered by receipt of a cross-protocol access notification. These responses may be triggered by all such notifications or response processor 626 may include logic for evaluating one or more parameters regarding the nature of the cross-protocol access, such as which other data storage protocol was used, what the operation in the access request was, and/or what other client system or user sent the access request. Example response processes may include generating a security alert to one or more system users and/or system utilities, modifying a local instance of the client data in the target data object, and/or deleting the local instance of the client data in the target data object. In some embodiments, local data store 618.1 may include a local instance of the data object in write request 642 and response processor 626 may initiate a modification of the data object or related metadata. For example, the local instance of the data object may be processed using a data compression or encoding algorithm that may result in some loss or other risk to the original client data and may be acceptable once confirmation has been received that the data object is accessible from other client systems using other data storage protocols. In another example, the local instance may be no longer be necessary once the data object is accessible using other data storage protocols and client systems and may be deleted from local data store 618.1.

Object storage system 650 may be configured similarly to object storage system 500 in FIG. 5. In some embodiments, object storage system 650 may include a plurality of protocol handlers 652.1-$n$ corresponding to the different data storage protocols supported by object storage system 650 and client systems 610.1-$n$. Protocol handlers 652 may operate in conjunction with storage interface 654 to receive object storage requests, such as write request 642 and read request 644, and provide responsive data, messages, and notifications, such as notification 646. Object data requests may be fulfilled by storage operations to metadata store 658 and object store 660. Object storage system 650 may include a cross-protocol engine 656 configured to operate in conjunction with storage interface 654 to detect cross-protocol access events and initiate a responsive routine, such as sending notification 646.

Figure 7:
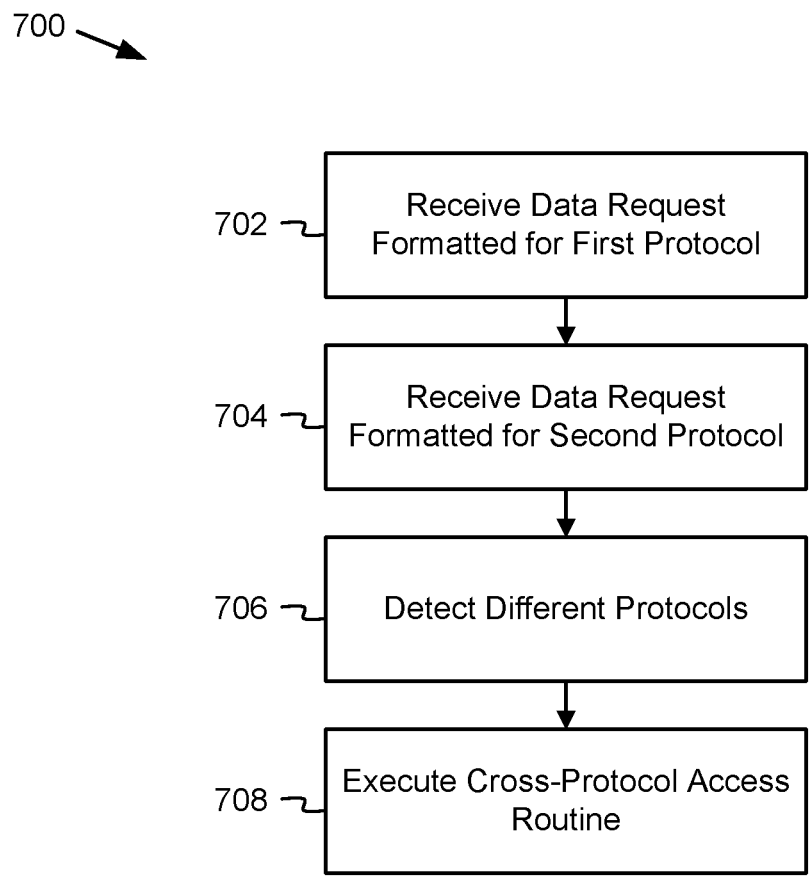
FIG. 7 illustrates an example method for handling cross-protocol access to data objects.

As shown in FIG. 7, the object storage system 500 may be operated according to an example method for detecting and responding to cross-protocol access requests, i.e. according to the method 700 illustrated by the blocks 702-708 of FIG. 7.

At block 702, a data request formatted according to a first data storage protocol may be received. For example, a storage interface may receive a write request from a client system through a protocol handler configured for the first data storage protocol and write a new data object or data object version to the object data store of the object storage system.

At block 704, a data request formatted according to a second data storage protocol and related to the same data object in the first request may be received. For example, the storage interface may receive a read request from another client system through a different protocol handler configured for the second data storage protocol and access the data object from the first data request to provide the read object data to the requesting client system.

At block 706, a difference between the first data storage protocol and the second data storage protocol may be detected. For example, a cross-protocol engine may detect that two distinct data storage protocols have been used to access the same data object.

At block 708, a routine responsive to the cross-protocol access detected at block 706 may be executed. For example, the cross-protocol engine may initiate a response routine based on the cross-protocol access event, such as a cross-protocol access notification to the first client system.

Figure 8:
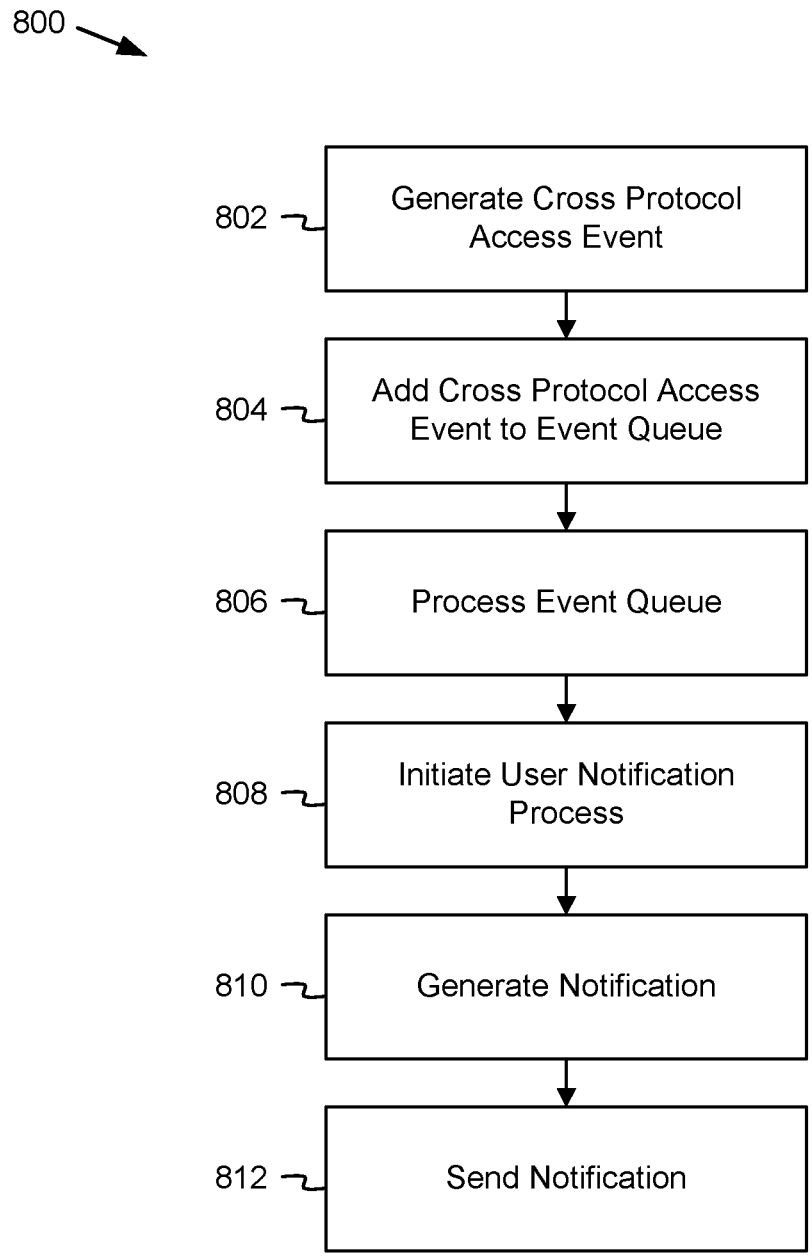
FIG. 8 illustrates an example method for responding to cross-protocol access.

As shown in FIG. 8, the object storage system 500 may be operated according to an example method for responding to cross-protocol access of a data object, i.e. according to the method 800 illustrated by the blocks 802-812 of FIG. 8. In some embodiments, method 800 may operate in conjunction with one or more blocks of method 700 in FIG. 7.

At block 802, a cross-protocol access event may be generated. For example, responsive to detecting distinct data storage protocols between different data requests for the same data object, the cross-protocol engine may instantiate a cross-protocol access event based on parameters from the different data requests.

At block 804, the cross-protocol access event may be added to an event queue for further processing. For example, the cross-protocol engine may send the cross-protocol access event to an external notification event queue in the storage interface of the object storage system.

At block 806, the event queue may be processed and events selected based on queue priority. For example, a notification engine may select events that trigger client notification from the event queue and select the cross-protocol access event when it is next in the external notification event queue.

At block 808, a user notification process may be initiated based on the cross-protocol access event. For example, the notification engine may initiate a user notification process for one or more users of the client system (or systems) using parameters from the cross-protocol access event.

At block 810, a notification message may be generated for the cross-protocol access event. For example, the notification engine may format a notification message that identifies the effected data object, the second data storage protocol, the data access operation, and the client system originating the access.

At block 812, the notification message may be sent to one or more client systems. For example, the storage interface may send the notification message to the client system and user that created and/or owns the data object.

Figure 9:
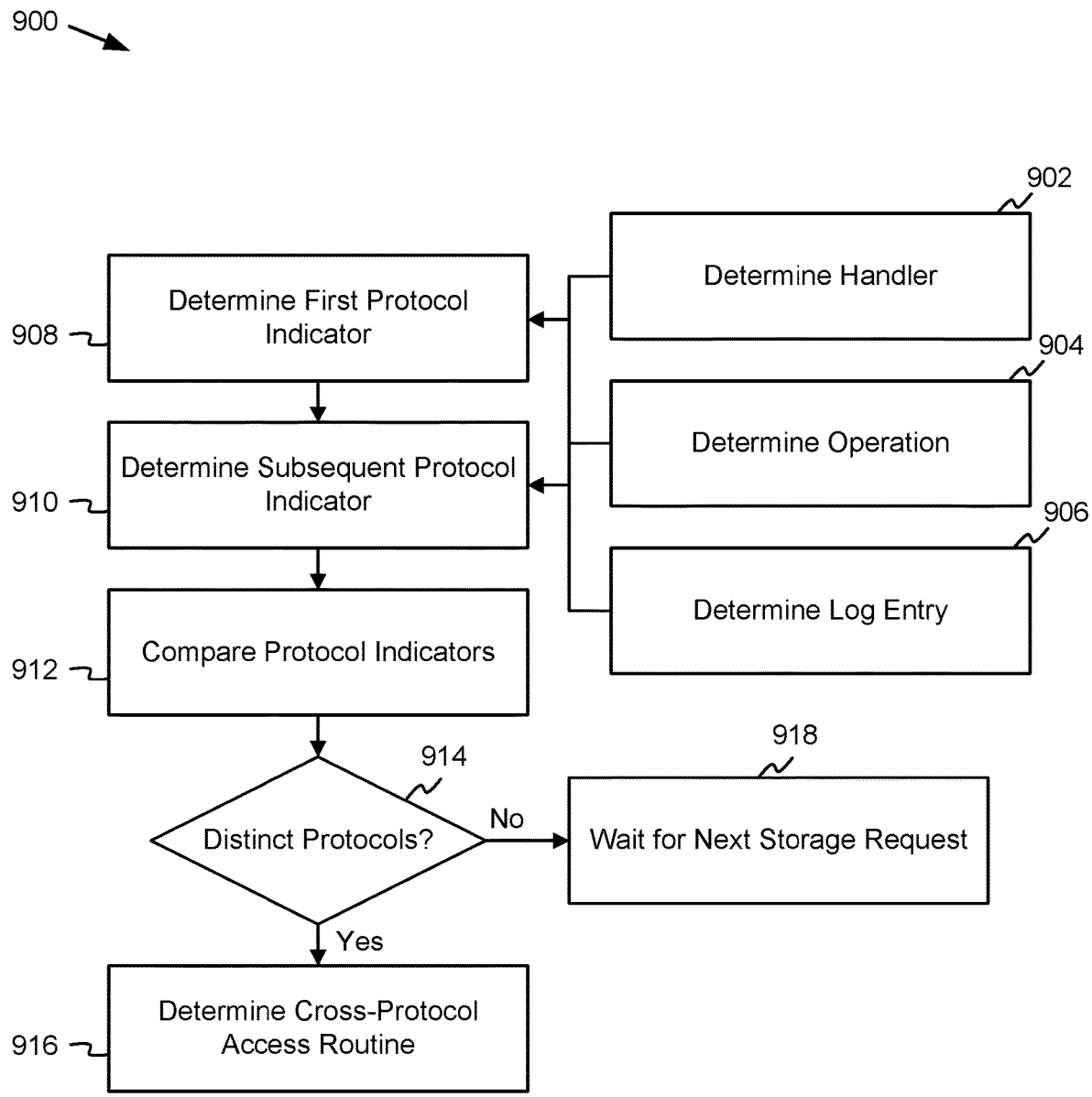
FIG. 9 illustrates an example method for detecting cross-protocol access.

As shown in FIG. 9, the object storage system 500 may be operated according to an example method for detecting cross-protocol access of a data object, i.e. according to the method 900 illustrated by the blocks 902-918 of FIG. 9. In some embodiments, method 900 may operate in conjunction with one or more blocks of method 700 in FIG. 7.

At block 902, a protocol handler for an incoming object data request may be determined. For example, the storage interface may include separate paths or functions for parsing data requests depending on the data storage protocol of those storage requests and the assignment of the protocol handler may indicate the data storage protocol of the request.

At block 904, a storage operation may be determined for an incoming object data request. For example, the storage interface may parse the data request into one or more storage operations to be executed in the object storage system and the storage operation may include a plurality of parameters for executing the operation, such as the object identifier, operation identifier, and, a protocol identifier.

At block 906, an operations log entry may be determined for one or more storage operations responsive to an incoming object data request. For example, the storage interface may generate and store an operations log entry in a metadata operations log for a storage operation responsive to the object data request and the operations log entry may include parameters, such timestamp, object identifier, operation identifier, and protocol identifier in a key value entry.

At blocks 908 and 910, a first protocol indicator may be determined for a first object data request and subsequent protocol indicators may be determined for later data requests for the same data object. For example, the cross-protocol engine may determine the protocol indicators, such as a protocol identifier, for each data request from the protocol handler, storage operation parameters, and/or operations log entries determined at blocks 902, 904, 906. In some embodiments, block 910 may be executed for any number of additional data requests targeting the data object, such as every data request or until a first cross-protocol access event is detected.

At block 912, the protocol indicators for two or more object data requests and resulting operations may be compared. For example, the cross-protocol engine may compare the first protocol indicator to each subsequent protocol indicator as the subsequent object data requests are received and processed.

At block 914, whether the storage protocols are distinct may be evaluated. For example, the cross-protocol engine may determine that the protocol indicators, such as protocol identifier values, do not indicate the same data storage protocol. If yes, the data storage protocols are distinct and method 900 may proceed to block 916. If no, the data protocols are not distinct and method 900 may proceed to block 918.

At block 916, a cross-protocol access routine responsive to the distinct data storage protocols may be determined. For example, the cross-protocol engine may initiate a user notification process, such as method 800 in FIG. 8.

At block 918, a next storage request may be awaited. For example, method 900 may return to blocks 902-906 for processing a next object data request for the same data object and proceed to block 910 to determine a subsequent protocol indicator for that next request.

Figure 10:
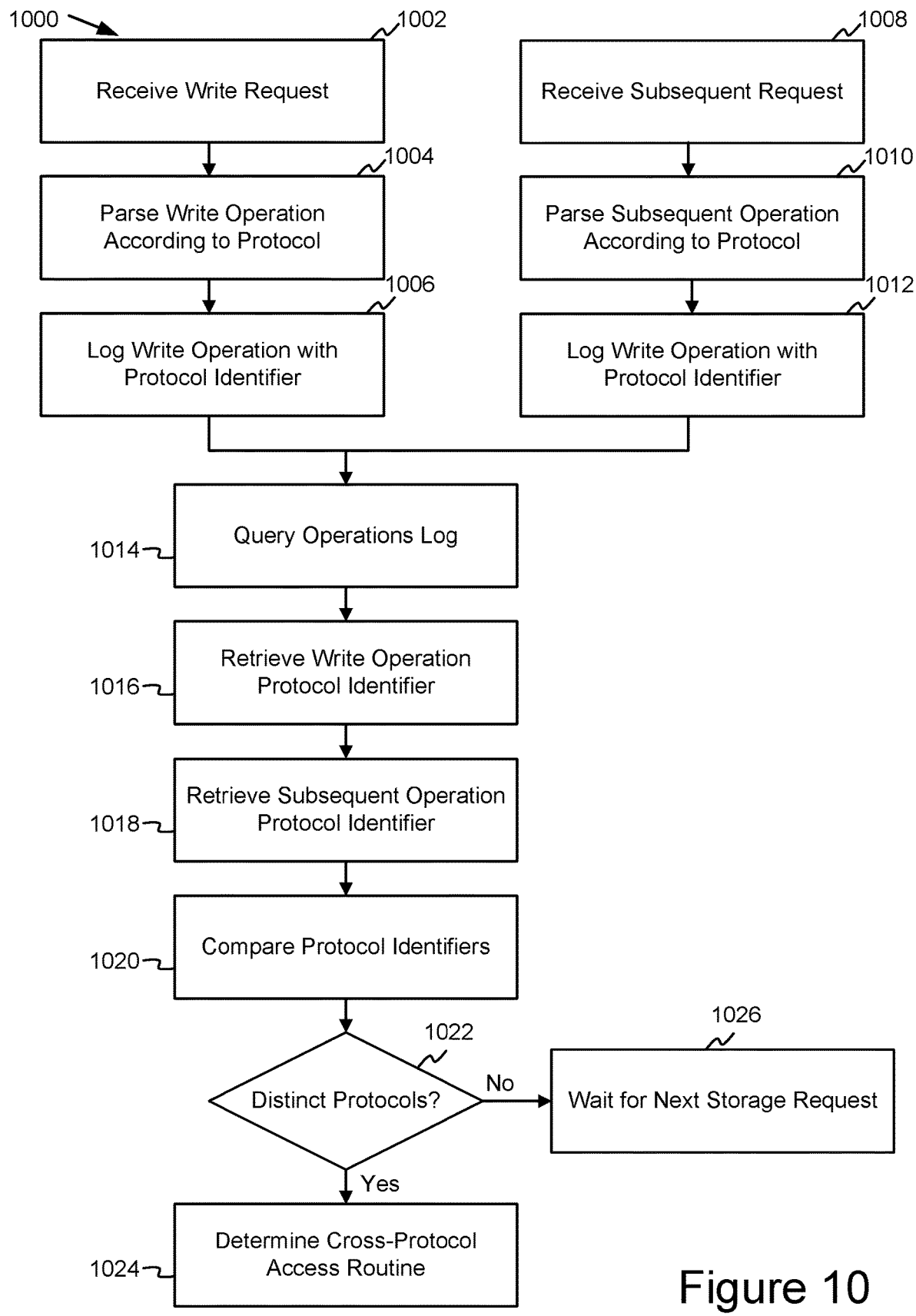
FIG. 10 illustrates an example method for detecting cross-protocol access from an operations log.

As shown in FIG. 10, the object storage system 500 may be operated according to another example method for detecting cross-protocol access of a data object, i.e. according to the method 1000 illustrated by the blocks 1002-1026 of FIG. 10. In some embodiments, method 900 may operate in conjunction with one or more blocks of method 700 in FIG. 7.

At block 1002, a write request may be received. For example, the storage interface may receive a write request for a new data object from a client system.

At block 1004, the write request may be parsed into a write operation according the data storage protocol of the write request. For example, the storage interface may process the incoming write request through a protocol handler for that particular data storage protocol.

At block 1006, an operations log entry for the write operation may be logged in an operations log and include a protocol identifier for the data storage protocol. For example, the storage interface may generate and store an operation entry in a metadata operations log for the write operation responsive to the object data request and the operations log entry may include parameters, such timestamp, object identifier, operation identifier, and protocol identifier in a key value entry.

At block 1008, a subsequent request may be received from a different client system. For example, the storage interface may receive a read request, delete request, or other access request for the same data object generated from the write request.

At block 1010, the subsequent request may be parsed into a subsequent storage operation according the data storage protocol of the subsequent request. For example, the storage interface may process the incoming request through a protocol handler for the particular data storage protocol to determine a responsive storage operation and parameters.

At block 1012, an operations log entry for the subsequent operation may be logged in the operations log and include the protocol identifier for that data storage protocol. For example, the storage interface may generate and store an operation entry in a metadata operations log for the subsequent read or other operation responsive to the object data request and the operations log entry may include parameters, such timestamp, object identifier, operation identifier, and protocol identifier in a key value entry.

At block 1014, the operations log may be queried. For example, the cross-protocol engine may use a metadata streamer to identify log entries for the data object based on the object identifier.

At block 1016, the write operation protocol identifier may be retrieved from the write log entry. For example, the cross-protocol engine may identify the write operation based on the timestamp and/or operation identifier and determine or identify the protocol identifier value in the write log entry.

At block 1018, the subsequent operation protocol identifier may be retrieved from the log entry for the subsequent operation. For example, the cross-protocol engine may identify the subsequent operation based on the timestamp and/or operation identifier and determine or identify the protocol identifier value in the log entry.

At block 1020, the protocol identifiers for the two object data requests and resulting operations may be compared. For example, the cross-protocol engine may compare the protocol identifier for the write request to the protocol identifier of the subsequent object data request from the log entries.

At block 1022, whether the storage protocols are distinct may be evaluated. For example, the cross-protocol engine may determine that the protocol identifier values do not indicate the same data storage protocol. If yes, the data storage protocols are distinct and method 1000 may proceed to block 1024. If no, the data protocols are not distinct and method 900 may proceed to block 918.

At block 1024, a cross-protocol access routine responsive to the distinct data storage protocols may be determined. For example, the cross-protocol engine may initiate a user notification process, such as method 800 in FIG. 8.

At block 1026, a next storage request may be awaited. For example, method 1000 may return to block 1008 for processing a next object data request for the same data object.

Figure 11:
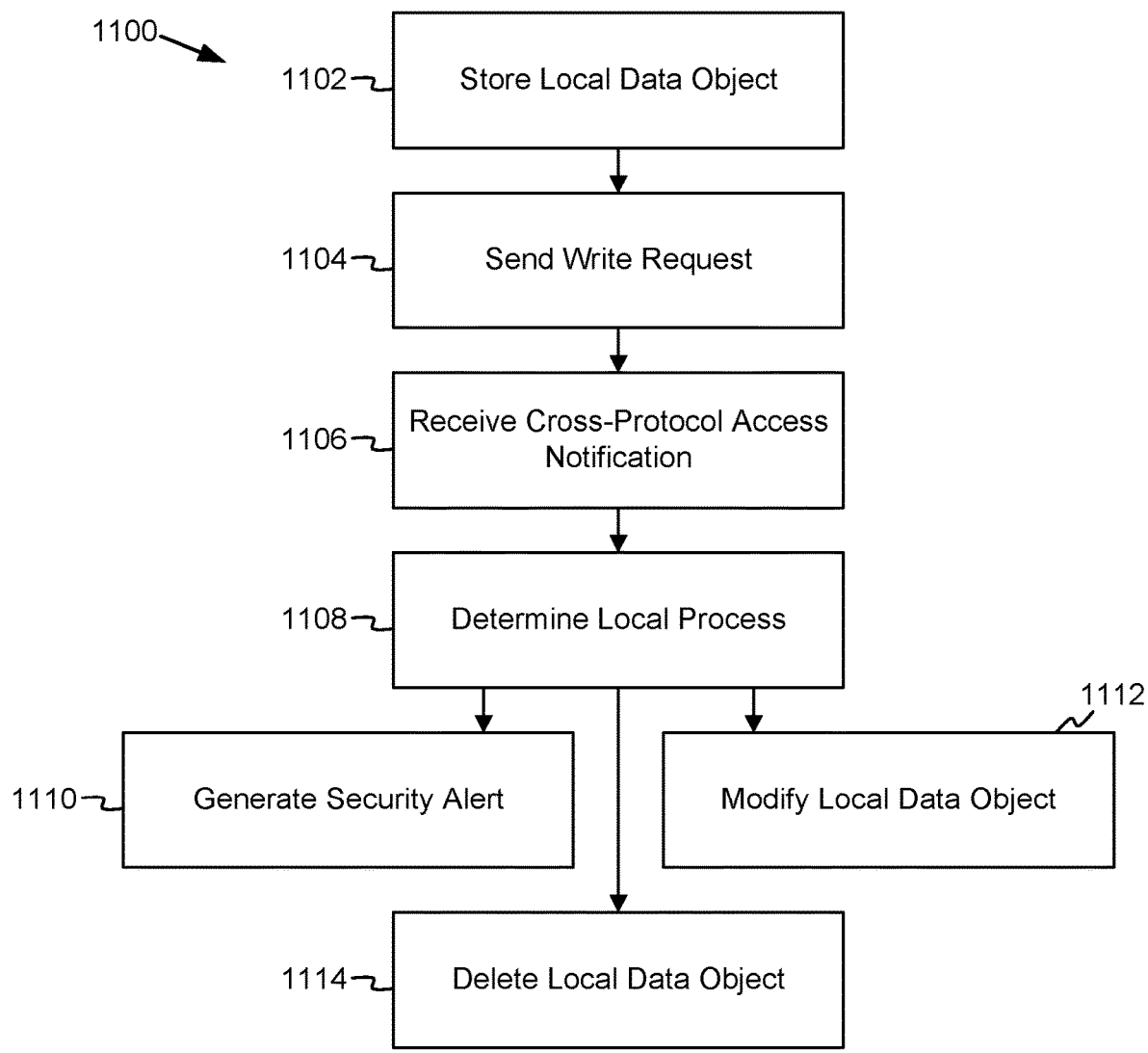
FIG. 11 illustrates an example method for a client system to respond to cross-protocol access.

As shown in FIG. 11, the client systems 610 may be operated according to an example method for responding to cross-protocol access of a data object, i.e. according to the method 1100 illustrated by the blocks 1002-1014 of FIG. 11. In some embodiments, method 900 may operate in response to method 700 in FIG. 7 and/or method 800 in FIG. 8.

At block 1102, a local instance of a data object may be stored. For example, the client system may store client application data in a non-transient data store local to the client system.

At block 1104, a write request may be sent to an object storage system for the data object. For example, the client system may send a write request to an object storage system configured similarly to object storage system 500 using the client system's data storage protocol.

At block 1106, a cross-protocol access notification may be received. For example, the client system may receive a cross-protocol access notification in response to a cross-protocol access event for the data object detected by the object storage system.

At block 1108, a local process for responding to the cross-protocol access notification may be determined. For example, the client system may include a response configuration that selects one or more local processes selected from blocks 1110, 1112, and 1114.

At block 1110, a security alert may be generated. For example, the client system may determine that cross-protocol access to the data object is an aberrant event that may represent a security risk and an administrative user or system utility may be notified.

At block 1112, the local instance of the data object may be modified. For example, the client system may determine that cross-protocol access may initiate further processing or use of the corresponding local instance of the data object, such as encoding, processing, or releasing for other modification.

At block 1114, the local instance of the data object may be deleted. For example, the client system may determine that cross-protocol access indicates that the local instance of the data object is no longer needed and may initiate a delete process for the corresponding local instance.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

What is claimed is:

1. A computer-implemented method, comprising:
   receiving, from a first client, a first data request for a first operation associated with a data object, wherein the first data request is formatted according to a first data storage protocol;
   receiving, from a second client, a second data request for a second operation associated with the data object, wherein the second data request is formatted according to a second data storage protocol;
   detecting that the second data storage protocol is distinct from the first data storage protocol; and
   executing a routine based on the second data storage protocol being distinct from the first data storage protocol, wherein executing the routine includes:
      generating a notification indicating the second operation and the second data storage protocol; and
      sending the notification to the first client.

2. The computer-implemented method of claim 1, wherein:
   the first data request is received via a network from the first client;
   the second data request is received via the network from the second client;
   the first client is configured to use the first data storage protocol to access the data object in an object data store; and
   the second client is configured to use the second data storage protocol to access the data object in the object data store.

3. The computer-implemented method of claim 2, further comprising:
   determining, at the first client, a process for processing a corresponding local instance of the data object based on the notification.

4. The computer-implemented method of claim 3, wherein the process includes deleting, responsive to receiving the notification, the corresponding local instance of the data object from a non-transitory data store associated with the first client.

5. The computer-implemented method of claim 1, wherein:
   the first data request is a write request to write the data object to a non-transitory data store; and
   the second data request is a read request to read the data object from the non-transitory data store.

6. The computer-implemented method of claim 1, further comprising:
   determining the first operation associated with the first data request; and
   determining the second operation associated with the second data request, wherein:
   detecting that the second data storage protocol is distinct from the first data storage protocol includes comparing a first protocol indicator associated with the first operation and a second protocol indicator associated with the second operation.

7. The computer-implemented method of claim 1, further comprising:
   determining, based on a first protocol handler for the first data request, the first data storage protocol; and
   determining, based on a second protocol handler for the second data request, the second data storage protocol.

8. The computer-implemented method of claim 1, further comprising:
   logging the first operation in a first operation entry in an operations log, wherein the first operation entry includes a first protocol indicator associated with the first operation and the data object;
   logging the second operation in a second operation entry in the operations log, wherein the second operation entry includes a second protocol indicator associated with the second operation and the data object; and
   querying the operations log for operation entries associated with the data object, wherein detecting that the second data storage protocol is distinct from the first data storage protocol includes:
      retrieving the first protocol indicator from the first operation entry;
      retrieving the second protocol indicator from the second operation entry; and
      comparing the first protocol indicator to the second protocol indicator.

9. The computer-implemented method of claim 8, wherein executing the routine based on the second data storage protocol being distinct from the first data storage protocol includes:
   generating, based on the first protocol indicator being different from the second protocol indicator, a cross-protocol access event; and
   initiating, responsive to the cross-protocol access event, a user notification process for a user of the data object.

10. The computer-implemented method of claim 9, wherein executing the routine based on the second data storage protocol being distinct from the first data storage protocol further includes:
    adding the cross-protocol access event to an external notification event queue; and
    processing the external notification event queue to generate a notification message to the first client.

11. A system comprising:
    a processor;
    a memory;
    a client request handler, stored in the memory for execution by the processor, configured to:
       receive, from a first client, a first data request for a first operation associated with a data object, wherein the first data request is formatted according to a first data storage protocol; and
       receive, from a second client, a second data request for a second operation associated with the data object, wherein the second data request is formatted according to a second data storage protocol;
    a cross-protocol engine, stored in the memory for execution by the processor, configured to:

detect that the second data storage protocol is distinct from the first data storage protocol; and execute a routine based on the second data storage protocol being distinct from the first data storage protocol; and a notification engine, stored in the memory for execution by the processor, configured to:

generate a notification indicating the second operation and the second data storage protocol; and send the notification to the first client.

12. The system of claim 11, further comprising:

a network interface configured to:

receive the first data request via a network from the first client; and receive the second data request via the network from the second client, wherein:

the first client is configured to use the first data storage protocol to access the data object in an object data store associated with the client request handler; and the second client is configured to use the second data storage protocol to access the data object in the object data store associated with the client request handler.

13. The system of claim 12, further comprising:

the first client, wherein the first client includes a non-transitory data store and is configured to:

receive the notification; and determine, based on the notification, a process for processing a corresponding local instance of the data object stored in the non-transitory data store.

14. The system of claim 13, wherein the process includes deleting, responsive to receiving the notification, the corresponding local instance of the data object from the non-transitory data store associated with the first client.

15. The system of claim 11, further comprising:

a non-transitory data store, wherein:

the first data request is a write request to write the data object to the non-transitory data store; and the second data request is a read request to read the data object from the non-transitory data store.

16. The system of claim 11, wherein:

the cross-protocol engine is further configured to:

determine the first operation associated with the first data request; and determine the second operation associated with the second data request; and detecting that the second data storage protocol is distinct from the first data storage protocol includes comparing a first protocol indicator associated with the first operation and a second protocol indicator associated with the second operation.

17. The system of claim 11, further comprising:

a first protocol handler, stored in the memory for execution by the processor, configured to parse the first data request in accordance with the first data storage protocol; and a second protocol handler, stored in the memory for execution by the processor, configured to parse the second data request in accordance with the second data storage protocol;

wherein detecting that the second data storage protocol is distinct from the first data storage protocol includes:

determining that the first data request was parsed by the first protocol handler; and determining that the second data request was parsed by the second protocol handler.

18. The system of claim 11, further comprising:

an operations log, stored in the memory, configured to:

log the first operation in a first operation entry in an operations log, wherein the first operation entry includes a first protocol indicator associated with the first operation and the data object; and log the second operation in a second operation entry in the operations log, wherein the second operation entry includes a second protocol indicator associated with the second operation and the data object;

wherein the cross-protocol engine is further configured to:

query the operations log for operation entries associated with the data object;

retrieve the first protocol indicator from the first operation entry;

retrieve the second protocol indicator from the second operation entry; and compare the first protocol indicator to the second protocol indicator to detect that the second data storage protocol is distinct from the first data storage protocol.

19. The system of claim 18, wherein the cross-protocol engine is further configured to:

generate, based on the first protocol indicator being different from the second protocol indicator, a cross-protocol access event; and initiate, responsive to the cross-protocol access event, a user notification process for a user of the data object.

20. A system comprising:

a non-transitory data store;

means for receiving, from a first client, a first data request for a first operation associated with a data object to be written to the non-transitory data store, wherein the first data request is formatted according to a first data storage protocol;

means for receiving, from a second client, a second data request for a second operation associated with the data object stored in the non-transitory data store, wherein the second data request is formatted according to a second data storage protocol;

means for detecting that the second data storage protocol is distinct from the first data storage protocol; and means for executing a routine based on the second data storage protocol being distinct from the first data storage protocol, wherein executing the routine includes:

generating a notification indicating the second operation and the second data storage protocol; and sending the notification to the first client.

* * * * *